(12) United States Patent
Ouchi

(10) Patent No.: US 9,983,841 B2
(45) Date of Patent: May 29, 2018

(54) PROJECTION TYPE IMAGE DISPLAY APPARATUS, METHOD, AND STORAGE MEDIUM IN WHICH CHANGES IN LUMINANCE BETWEEN AN IMAGE OVERLAP AREA AND AN AREA OUTSIDE THE IMAGE OVERLAP AREA ARE LESS VISIBLE

(71) Applicant: CANON KABUSHIKI KAISHA, Tokyo (JP)

(72) Inventor: Akihiro Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 14/271,286

(22) Filed: May 6, 2014

(65) Prior Publication Data
US 2014/0333648 A1    Nov. 13, 2014

(30) Foreign Application Priority Data

May 8, 2013    (JP) ................................. 2013-098738

(51) Int. Cl.
| | |
|---|---|
| *H04N 9/31* | (2006.01) |
| *G06F 3/14* | (2006.01) |
| *G09G 3/00* | (2006.01) |
| *G09G 5/02* | (2006.01) |
| *G09G 5/10* | (2006.01) |
| *G03B 37/04* | (2006.01) |

(52) U.S. Cl.
CPC ........... *G06F 3/1446* (2013.01); *G09G 3/002* (2013.01); *G09G 5/02* (2013.01); *G09G 5/10* (2013.01); *H04N 9/3147* (2013.01); *H04N 9/3182* (2013.01); *G03B 37/04* (2013.01); *G09G 2310/0232* (2013.01); *G09G 2320/0233* (2013.01); *G09G 2320/0238* (2013.01); *G09G 2320/0285* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 2003/0020736 A1* | 1/2003 | Kimura | ..................... | G09G 5/02 345/690 |
| 2005/0162360 A1* | 7/2005 | Ishihara | ............... | G09G 3/2011 345/89 |
| 2006/0238551 A1* | 10/2006 | Dalal | ..................... | G09G 3/002 345/690 |
| 2009/0161020 A1* | 6/2009 | Barnhoefer | .......... | G09G 3/3406 348/673 |

(Continued)

FOREIGN PATENT DOCUMENTS

| | | |
|---|---|---|
| JP | 2002-268625 A | 9/2002 |
| JP | 2006129437 A | 5/2006 |

*Primary Examiner* — Xiao Wu
*Assistant Examiner* — Steven Elbinger
(74) *Attorney, Agent, or Firm* — Canon U.S.A., Inc. IP Division

(57) ABSTRACT

A multiscreen display is formed in which changes in luminance between an image overlap area and areas outside the image overlap area are less visible across a range of low to high gradations. An offset correction value Doffset that is linearly decreased at the lowest gradation of the input image signal so that the offset correction value becomes 0 at gradations higher than the predetermined gradation Lset, is added to an input image signal.

10 Claims, 12 Drawing Sheets

(56) References Cited

U.S. PATENT DOCUMENTS

2011/0234921 A1* 9/2011 Ivashin ............... H04N 9/3182
348/745
2013/0258203 A1* 10/2013 Atkins .................... G09G 5/02
348/708

* cited by examiner

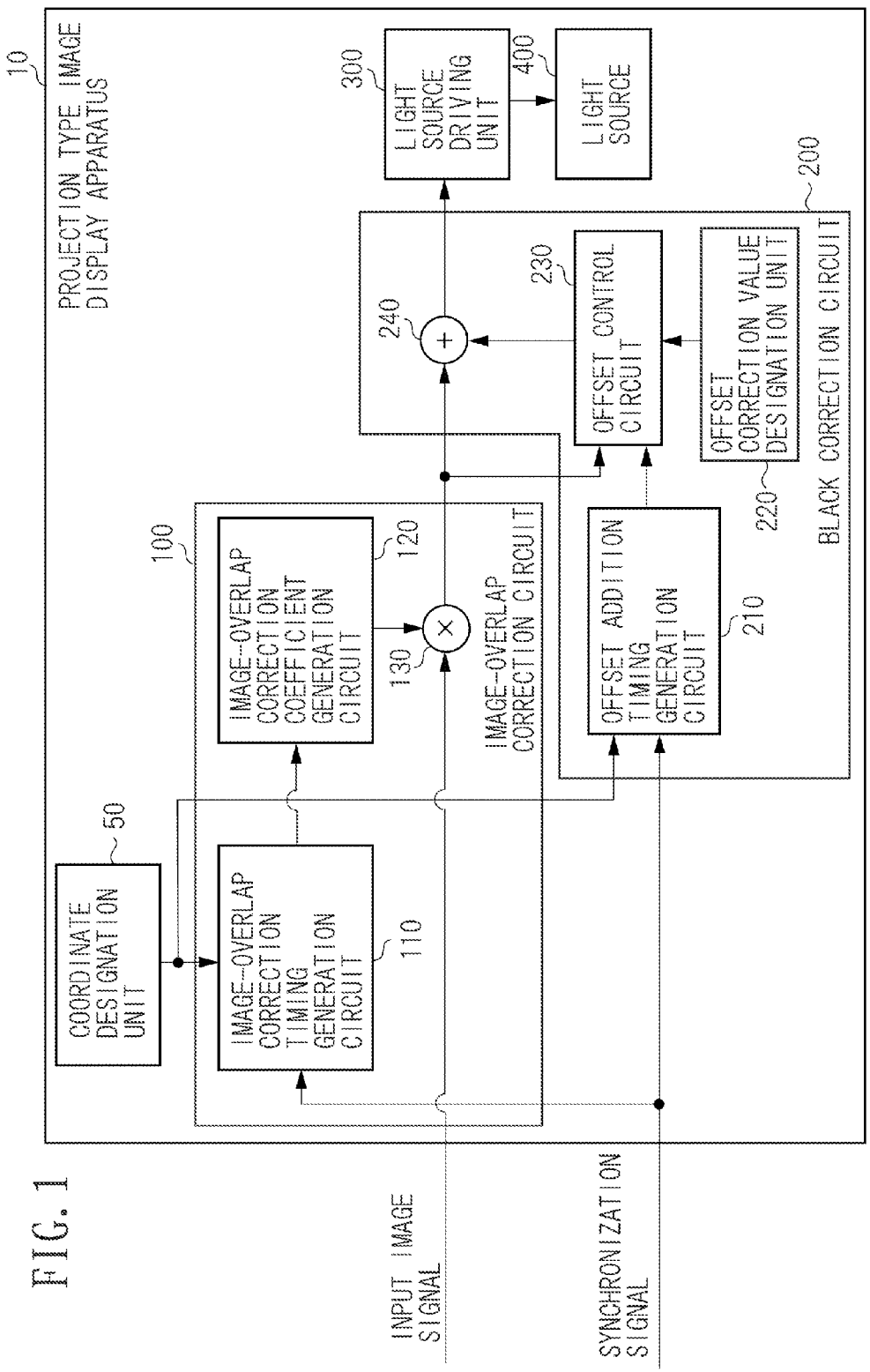

MULTISCREEN
DISPLAY
INCLUDING
TWO SCREENS

WITHOUT BLACK
CORRECTION

WITH BLACK
CORRECTION

OFFSET CORRECTION VALUE IS SAME FOR ALL GRADATIONS

OFFSET CORRECTION VALUE IS 0 FOR HIGHEST GRADATION

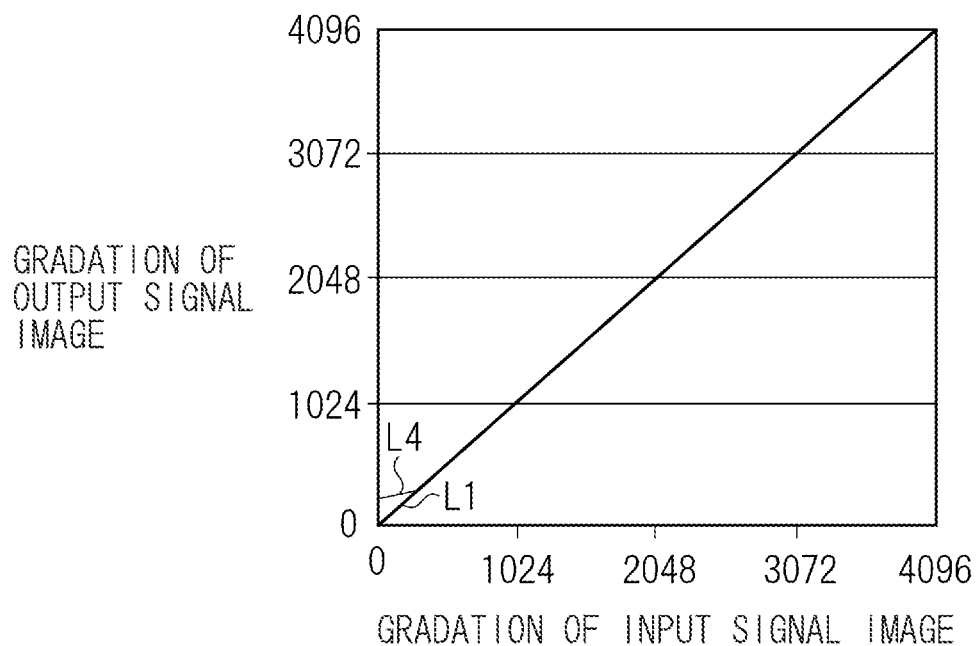

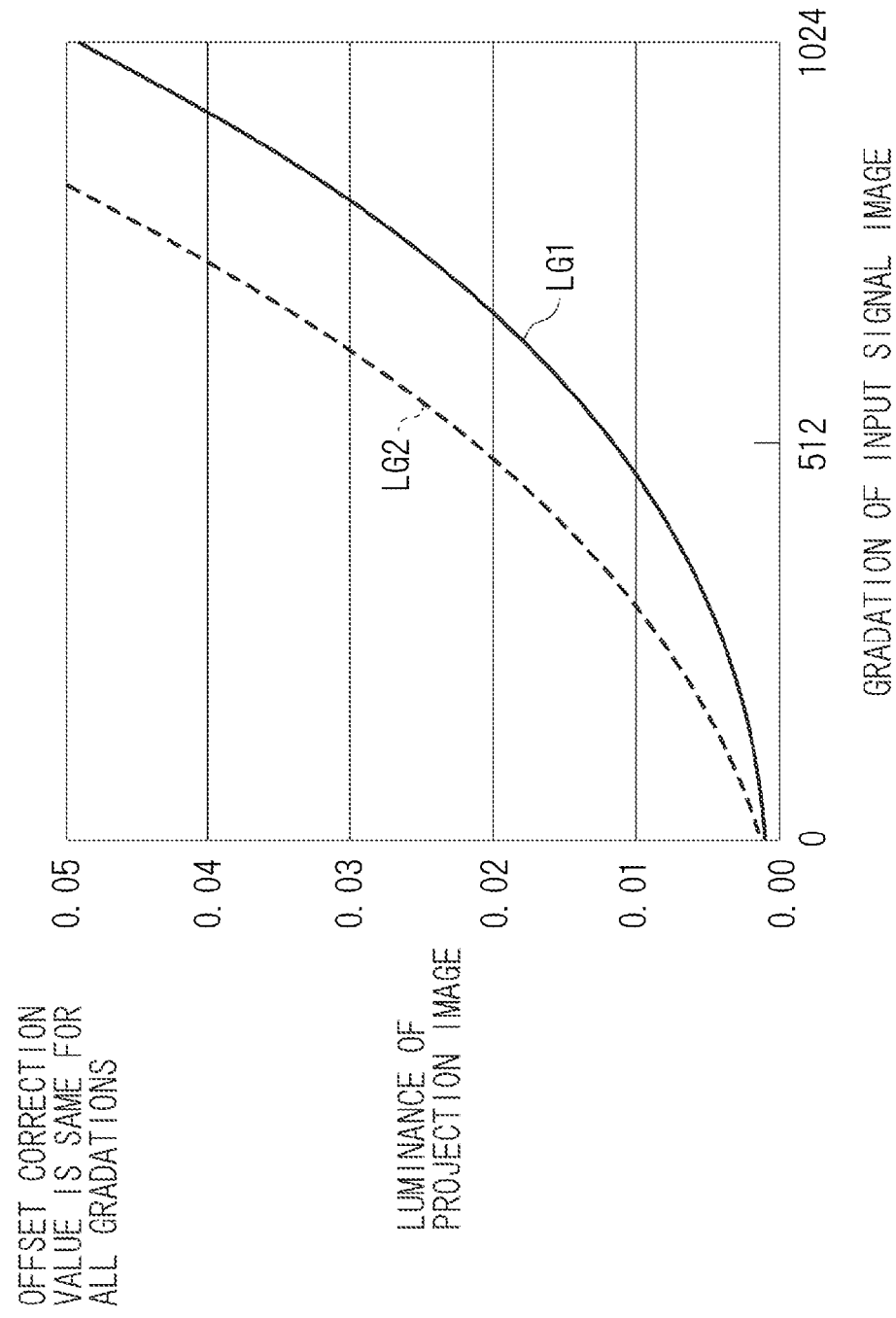

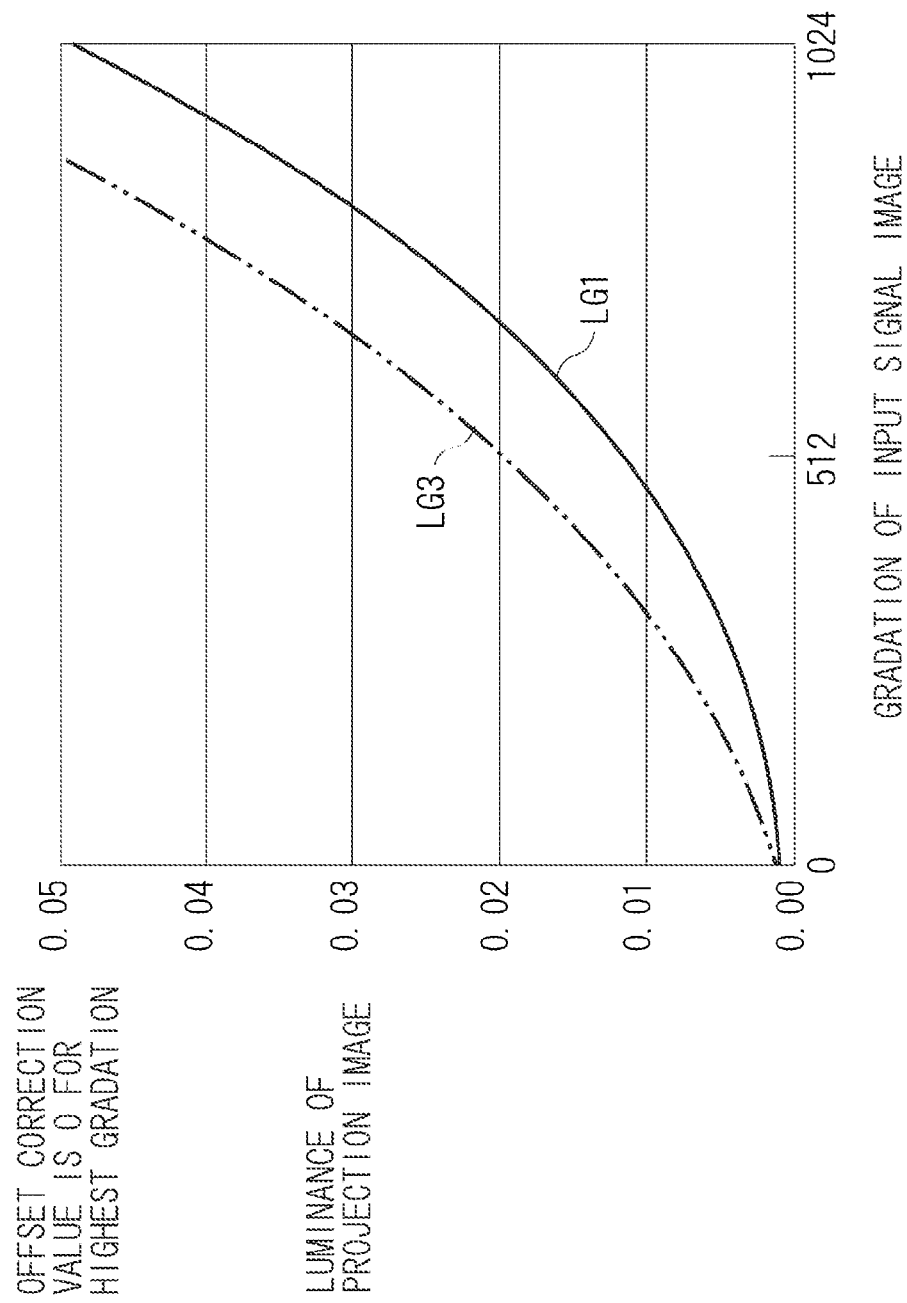

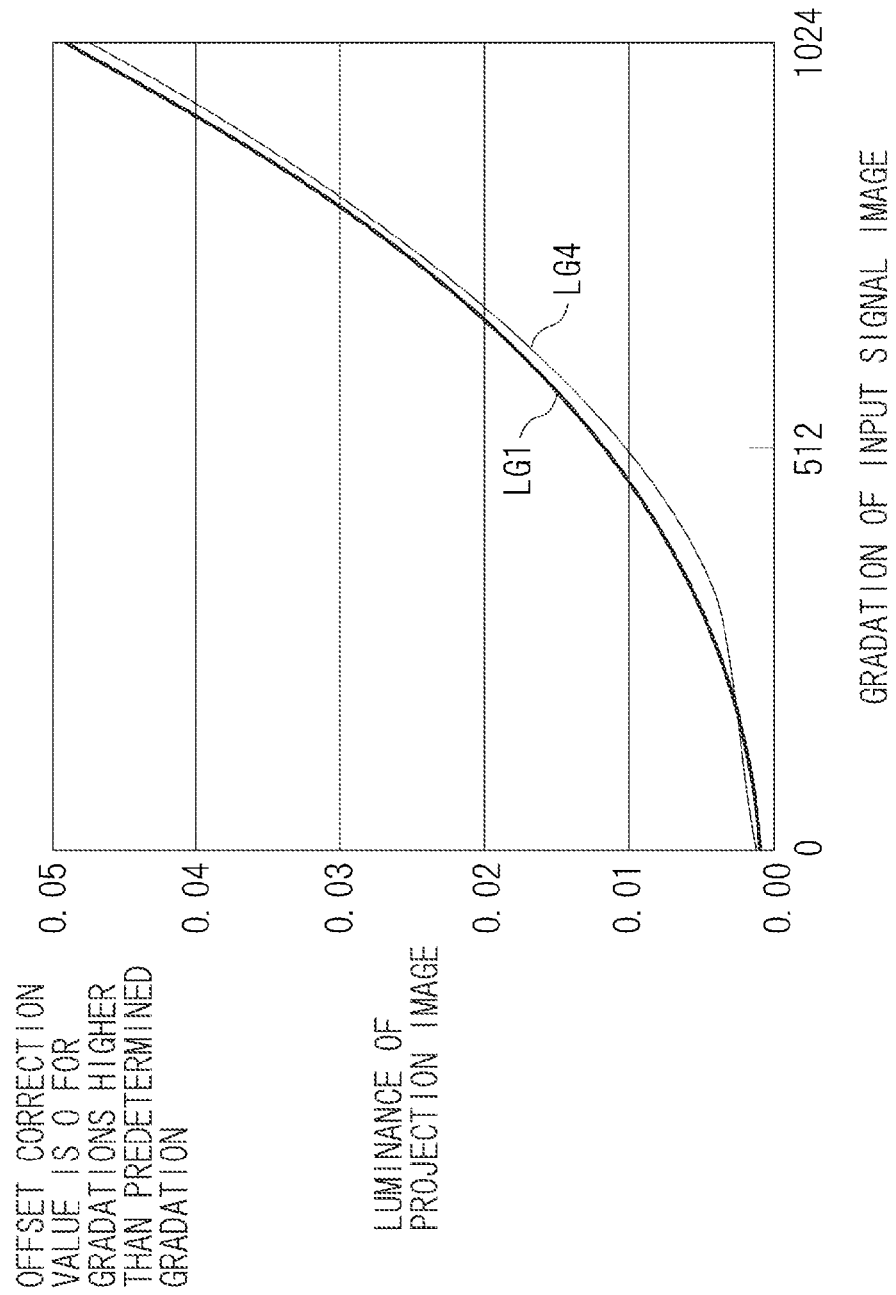

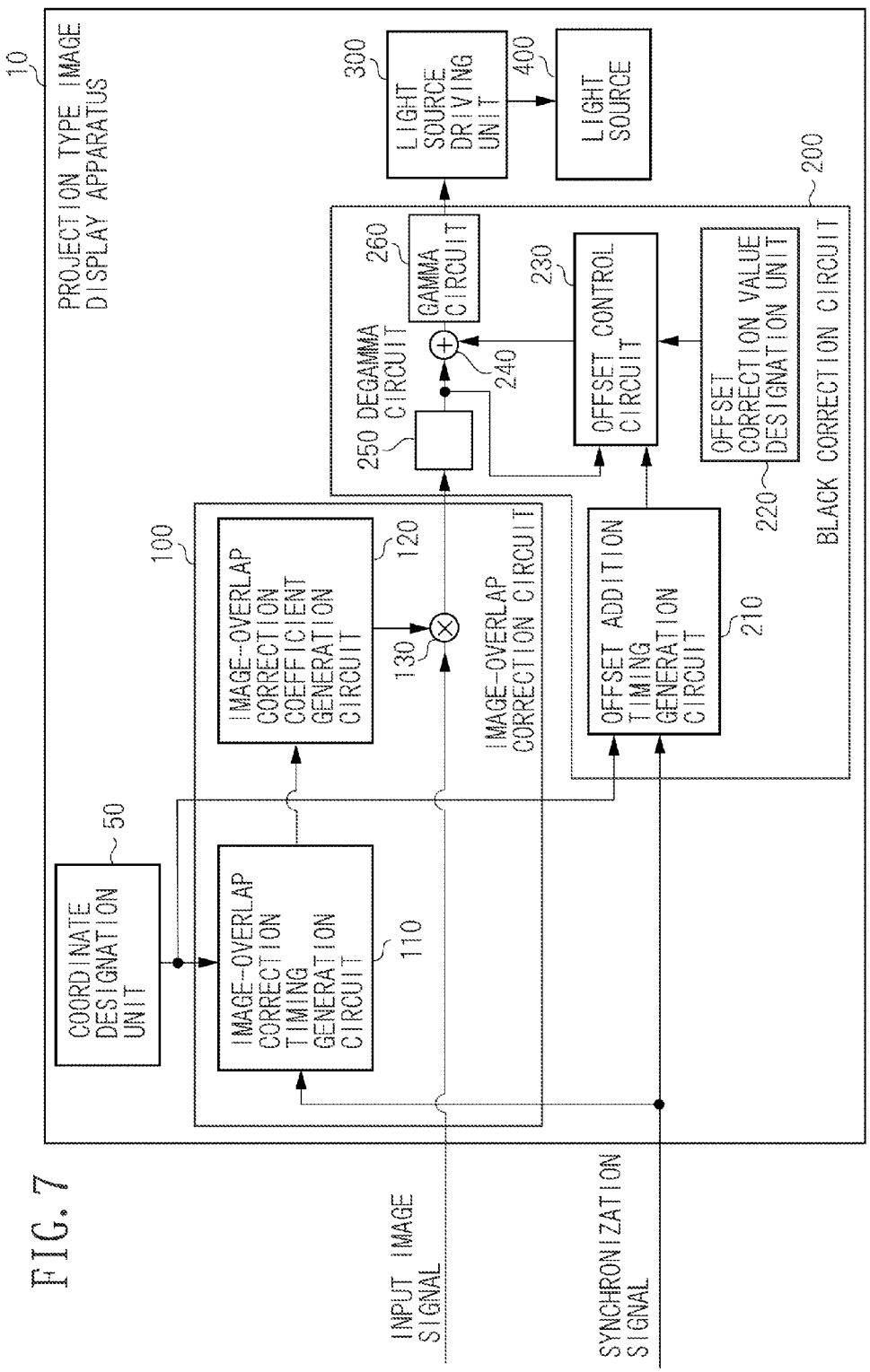

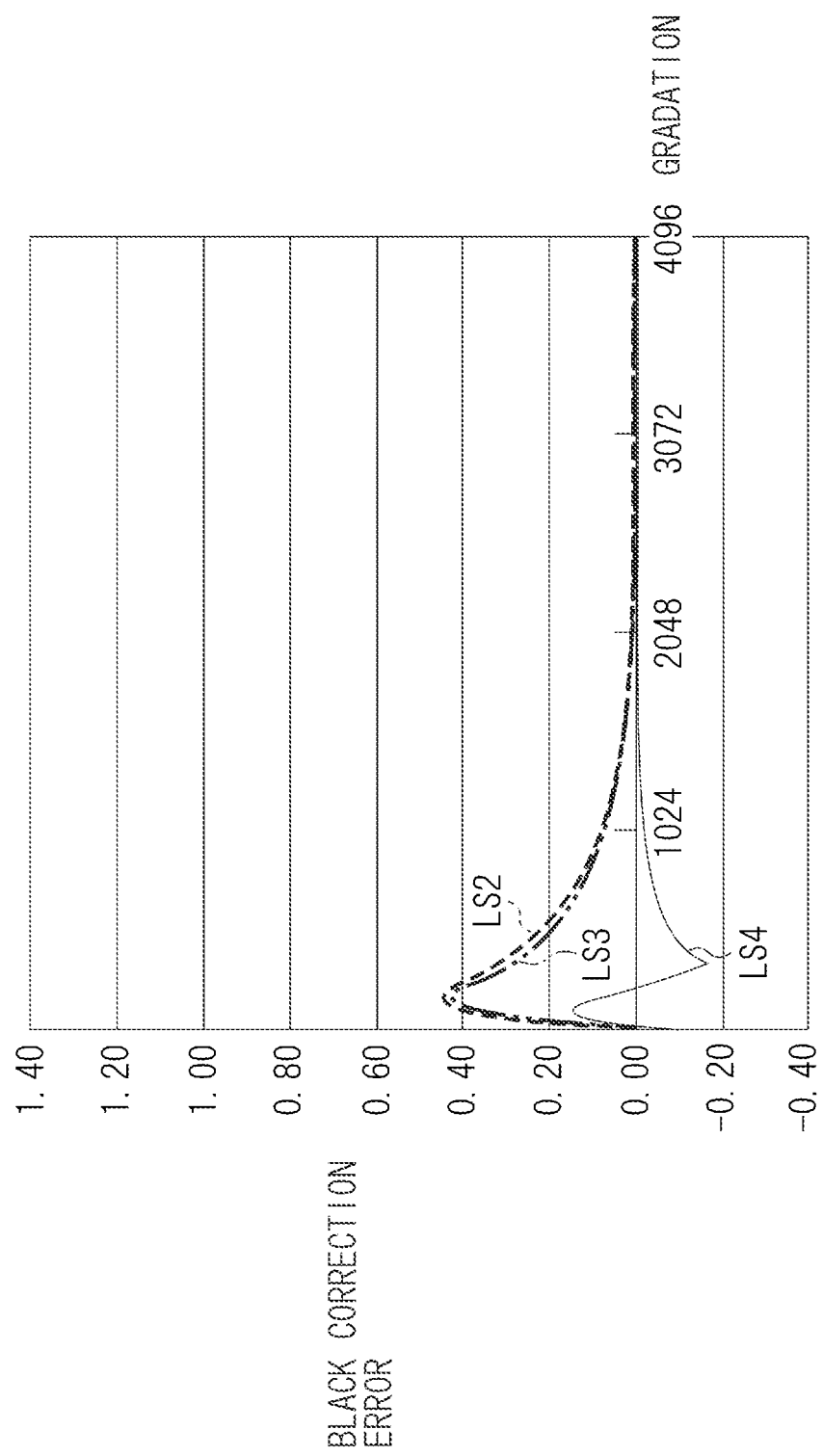

PROJECTION TYPE IMAGE DISPLAY APPARATUS, METHOD, AND STORAGE MEDIUM IN WHICH CHANGES IN LUMINANCE BETWEEN AN IMAGE OVERLAP AREA AND AN AREA OUTSIDE THE IMAGE OVERLAP AREA ARE LESS VISIBLE

BACKGROUND OF THE INVENTION

Field of the Invention

The present invention relates to a projection type image display apparatus, a method for displaying a projection image, and a storage medium. In particular, the present invention is suitable for use in forming a multiscreen display in which images projected from a plurality of projection type image display apparatuses onto the multiscreen display include an overlap area.

Description of the Related Art

Conventionally, a multiscreen display has been formed using images projected from a plurality of projection type image display apparatuses. To form a multiscreen display in this way, adjacent images among images projected from a plurality of projection type image display apparatuses are arranged to include an overlapping image area, and luminance correction is performed on image signals of the overlapping image area to make seams of the adjacent images less noticeable. Furthermore, the overlapping image area is arranged to have a predetermined width, so that even if characteristics such as luminance and color slightly differ between the projection type image display apparatuses, the differences in the characteristics are less visible. Hereinafter, an "overlapping image area" will be referred to as an "image overlap area" as needed.

Among the projection type image display apparatuses, a transmission type image display apparatus and a reflection type image display apparatus cannot completely block transmitted light and reflected light, respectively. Thus, when a black is displayed in an image projected from a projection type image display apparatus, the black has a slight luminance. Therefore, when the black is displayed in a multiscreen display, the luminance of an effective image in an image overlap area becomes higher than the luminance of an effective image in areas outside the image overlap area. This causes seams of the image overlap area and the areas outside the image overlap area to be visually recognized.

In view of the foregoing, Japanese Patent Application Laid-Open No. 2002-268625 discusses a technique in which an offset (correction value) is added to signals of an effective image in areas outside an image overlap area for each projection type image display apparatus to realize an entirely uniform black display.

However, if the correction value is uniformly added to all gradations, luminance saturation occurs in high gradation areas. Furthermore, when an image on a display that has undergone gamma (γ) correction is viewed, a luminance discontinuity becomes visibly recognizable in the high gradation areas.

A possible method for avoiding luminance saturation may be a method in which the correction value is set to be 0 at the highest gradation. However, even with this method, the luminance discontinuity in intermediate gradation areas that occurs when an image on a display that has undergone gamma (γ) correction is viewed, cannot be overcome.

SUMMARY OF THE INVENTION

The present invention is directed to a technique for forming a multiscreen display in which changes in luminance between an image overlap area and an area outside the image overlap area are less visible across a range of low to high gradations.

According to an aspect of the present invention, a display control apparatus includes a projection unit configured to project an image, and a control unit configured to perform control to increase luminance of an image signal corresponding to a non-overlap area in which a first projection area displaying a first image projected from the projection unit does not overlap a second projection area displaying a second image projected from another projector.

Further features of the present invention will become apparent from the following description of exemplary embodiments with reference to the attached drawings.

BRIEF DESCRIPTION OF THE DRAWINGS

FIG. 1 is a diagram illustrating a first example of a configuration of a projection type image display apparatus.

FIGS. 3A, 3B, and 3C illustrate relationships between gradation of an input image signal and gradation of an output image signal.

FIGS. 5A, 5B, and 5C illustrate enlarged views of an area illustrated in FIG. 4 in which gradation of the input image signal is 0 to 1024.

FIG. 7 illustrates a second example of a configuration of a projection type image display apparatus.

FIG. 8 illustrates a second example of relationships between black correction errors and gradation of an input image signal.

DESCRIPTION OF THE EMBODIMENTS

Figures 2A, 2B, 2C:
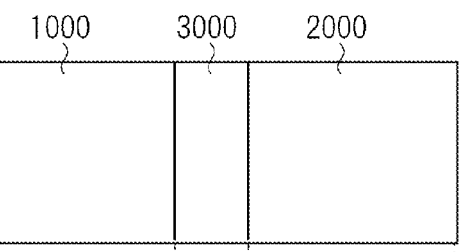
FIGS. 2A, 2B, and 2C illustrate a relationship between a multiscreen display, screen positions, and a lowest gradation.

Various exemplary embodiments, features, and aspects of the invention will be described in detail below with reference to the drawings.

A first exemplary embodiment of the present invention will be described below.

FIG. 1 is a block diagram schematically illustrating an example of a configuration of a projection type image display apparatus 10 according to the present exemplary embodiment. The projection type image display apparatus 10 includes a coordinate designation unit 50, an image-overlap correction circuit 100, a black correction circuit 200, a light source driving unit 300, and a light source 400.

When projection image display processing is performed using a plurality of projection type image display apparatuses 10 to form a multiscreen display, coordinates of an image overlap area formed by images projected from the adjacent projection type image display apparatuses 10 are set using the coordinate designation unit 50. The coordinate designation unit 50 is realized by use of, for example, a user interface.

The image-overlap correction circuit 100 performs luminance correction on image signals corresponding to the image overlap area to make seams of the image overlap area and areas outside the image overlap area less visible.

The image-overlap correction circuit 100 includes an image-overlap correction timing generation circuit 110, an image-overlap correction coefficient generation circuit 120, and a multiplier 130.

The image-overlap correction timing generation circuit 110 generates a pixel position in the image overlap area based on the coordinates designated by the coordinate designation unit 50 and a synchronization signal. The image-overlap correction coefficient generation circuit 120 generates a correction coefficient for the image overlap area based on the pixel position generated by the image-overlap correction timing generation circuit 110. The multiplier 130 performs luminance correction by multiplying an input image signal by the correction coefficient generated by the image-overlap correction coefficient generation circuit 120.

The black correction circuit 200 includes an offset addition timing generation circuit 210, an offset correction value designation unit 220, an offset control circuit 230, and an adder 240.

The offset addition timing generation circuit 210 generates timing of adding an offset correction value based on the coordinates designated by the coordinate designation unit 50 and the synchronization signal.

The offset correction value designation unit 220 designates the offset correction value for the lowest gradation (=black) of an image signal. The offset correction value designation unit 220 is realized by use of, for example, a user interface.

The offset control circuit 230 generates an offset correction value for an image in an area outside the image overlap area that is specified based on the coordinates designated by the coordinate designation unit 50, according to the offset addition timing generated by the offset addition timing generation circuit 210.

The adder 240 adds the offset correction value generated by the offset control circuit 230 to an image signal having undergone the luminance correction performed by the image-overlap correction circuit 100. The image-overlap correction timing generation circuit 110 of the image-overlap correction circuit 100 and the offset addition timing generation circuit 210 of the black correction circuit 200 may be configured in common as a correction timing generation circuit.

The image signal having undergone the luminance correction of the image overlap area by the image-overlap correction circuit 100 and thereafter the black display correction by the black correction circuit 200 is projected via the light source driving unit 300 and the light source 400.

FIGS. 2A, 2B, and 2C conceptually illustrate an example of a multiscreen display (FIG. 2A) and examples of the relationship between screen positions in the multiscreen and the lowest gradation (gradation at which black is displayed) (FIGS. 2B and 2C).

The multiscreen display illustrated in FIG. 2A shows images projected from two projection type image display apparatuses 10 aligned side by side. In FIG. 2A, the multiscreen display includes projection images 1000 and 2000 (two non-overlap areas) and one image overlap area 3000. The projection image 1000 is an image (projection image) projected (only) from the first projection type image display apparatus 10. The projection image 2000 is an image (projection image) projected (only) from the second projection type image display apparatus 10 disposed adjacent to the first projection type image display apparatus 10. The image overlap area 3000 is an area where a part (predetermined area) of the projection image 1000 overlaps a part (predetermined area) of the projection image 2000.

FIG. 2B illustrates an example of a relationship between screen positions in the multiscreen display and the lowest gradation (gradation at which black is displayed) in a case where no black correction is performed. FIG. 2C illustrates an example of a relationship between screen positions in the multiscreen display and the lowest gradation (gradation at which black is displayed) in a case where black correction is performed.

In an image projected from a projection type image display apparatus, even when black is displayed, the image has slight luminance. Thus, as illustrated in FIG. 2B, the luminance in the image overlap area 3000 is higher than the luminance in the areas outside the image overlap area 3000. This causes luminance discontinuity at boundaries of the image overlap area 3000 to become visible. The black correction circuit 200 is configured to correct this luminance discontinuity. Specifically, as illustrated in FIG. 2C, the black correction circuit 200 adds the offset correction value to image signals of the areas outside the image overlap area 3000 to correct the image signals of the areas outside the image overlap area 3000 so that black displayed in the image overlap area 3000 and black displayed in the areas outside the image overlap area 3000 become uniform.

Figure 3A:
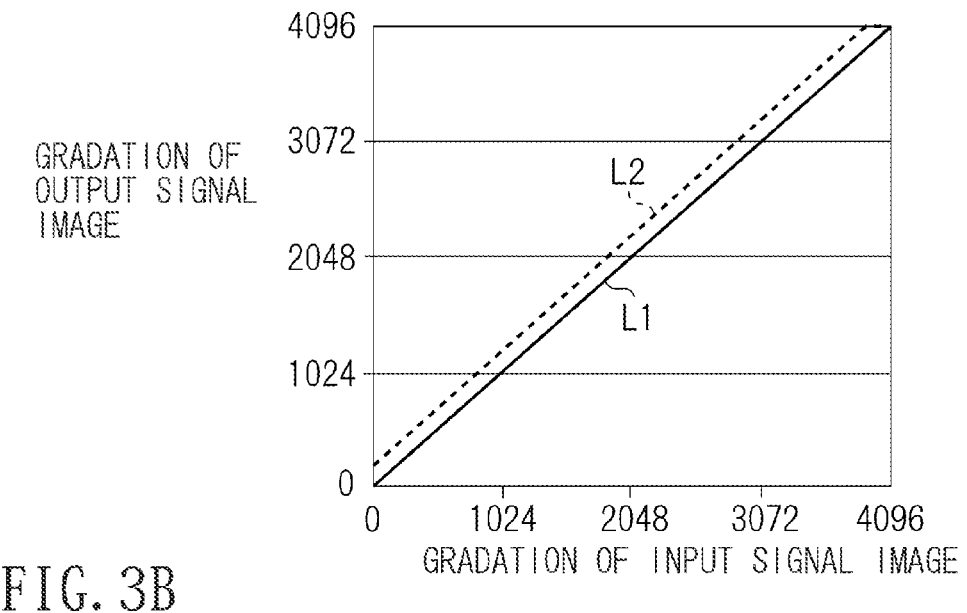
Figure 3B:
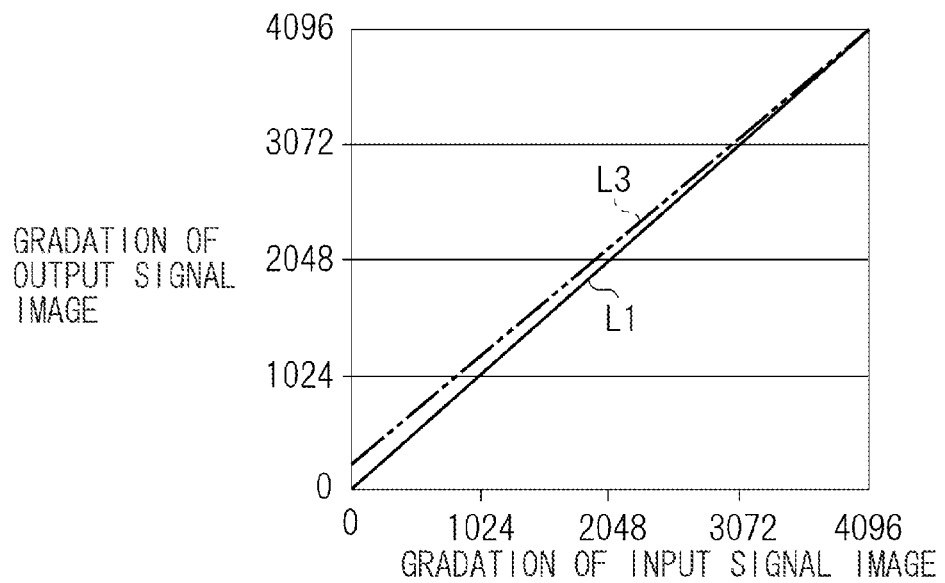

FIGS. 3A, 3B, and 3C illustrate examples of a relationship between gradation of an input image signal and gradation (gradation of an output image signal) in cases where an offset correction value is added to the input image signal and in a case where no offset correction value is added to the input image signal. In view of the gamma (γ) characteristics of the display, each gradation of the input image signal has been raised to the power of 2.2, which is a commonly-used gamma value.

Figure 4:
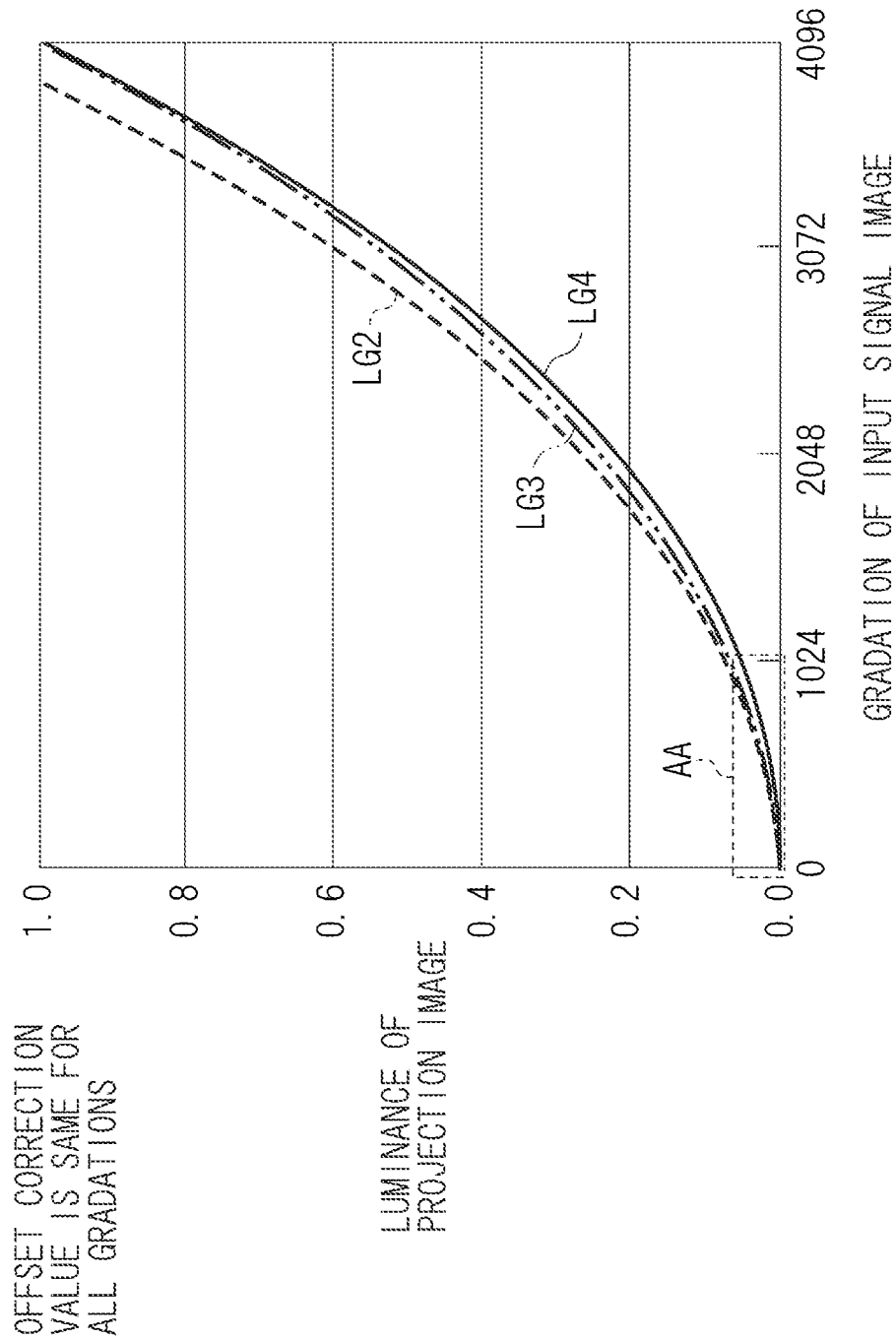
FIG. 4 illustrates relationships between gradation of an input image signal and luminance of a projection image to which an offset correction value has been added.

FIG. 4 illustrates an example of a relationship between gradation of an input image signal and luminance of a projection image in a case where an offset correction value is added to the input image signal. FIGS. 5A, 5B, and 5C illustrate enlarged views of an area AA illustrated in FIG. 4 in which gradation of the input image signal is 0 to 1024, together with luminance of the projection image in a case where no offset correction value is added to the input image signal. The luminance illustrated in FIG. 4 is a value obtained through normalization, at the highest luminance level, of the luminance of the image projected via the light source driving unit 300 and the light source 400 after the offset correction value is added to the luminance.

In FIGS. 3A to 3C, the vertical axis of a graph L1 indicates a gradation in a case where no offset correction value is added to the input image signal. In other words, the graph L1 is based on light source driving signals in the image overlap area 3000 illustrated in FIG. 2. In FIGS. 5A to 5C, a graph LG1 shows the luminance in the image overlap area 3000.

In FIG. 3A, the vertical axis of a graph L2 indicates a gradation in a case where the same offset correction value is added to all gradations of the input image signal. In this case, as indicated by the graph LG2 illustrated in FIG. 5A, the difference (luminance difference) between the graph L2 and the graph LG1 is 0 (zero) at the lowest gradation (=black). However, as the gradation of the input image signal increases, the luminance of the projection image (graph LG2) in a case where the offset correction value is added becomes higher than the luminance of the projection image (graph LG1) in a case where no offset correction value is added. In other words, performing the black correction causes luminance discontinuity at the boundaries of the image overlap area in a high luminance area.

In FIG. 3B, the vertical axis of a graph L3 indicates a gradation in a case where the following offset correction value is added to gradation levels of the input image signal. Specifically, the vertical axis of the graph L3 indicates a gradation in a case where the offset correction value, which is linearly decreased at the lowest gradation (0 in this case), is added to the input image signal so that the offset correction value at the highest gradation (4095 in this case) becomes 0. In this case, at the intermediate gradation levels of the input image signal, the luminance (graph LG3) of a projection image in a case where the offset correction value is added becomes higher than the luminance (graph LG1) of a projection image in a case where no offset correction value is added, as indicated by the graph LG3 illustrated in FIG. 5B.

In view of the foregoing, according to the present exemplary embodiment, the offset control circuit 230 performs the following operation (processing). That is, the offset control circuit 230 adds the offset correction value to the input image signal so that the gradation becomes as indicated by the graph L4 in FIG. 3C. Specifically, the offset control circuit 230 adds to the input image signal the offset correction value that is decreased at the lowest gradation of the input image signal so that the offset correction value becomes 0 at gradation levels that are higher than a predetermined gradation. For example, as indicated by expressions (1a) and (1b) below, the offset correction value is linearly decreased up to a predetermined gradation Lset of the input image signal and is set to 0 at gradations levels that are higher than the predetermined gradation Lset:

$$Doffset = Dblk - Dblk \times Lsig/Lset (Lsig \le Lset) \quad (1a)$$

$$Doffset = 0 (Lsig > Lset) \quad (1b)$$

where Doffset denotes an offset correction value, Dblk denotes an offset correction value at the lowest gradation, Lset denotes a predetermined gradation from which the offset value is set to 0, and Lsig denotes a gradation level of the input image signal.

In the foregoing method, depending on how the predetermined gradation Lset is selected, the graphs LG1 and LG4 have a cross point, at which the luminance difference between the graphs LG1 and LG4 is 0, between the lowest gradation and the predetermined gradation, as indicated by the graph LG4 in FIG. 5C. At the gradation levels below the cross point, the luminance of the graph LG4 is higher than the luminance of the graph LG1 (excessive correction). On the other hand, at gradation levels above the cross point, the luminance of the graph LG4 is lower than the luminance of the graph LG1 (insufficient correction). However, compared to FIGS. 5A and 5B, the overall difference in luminance between the graphs LG1 and LG4 can be reduced.

Figure 6:
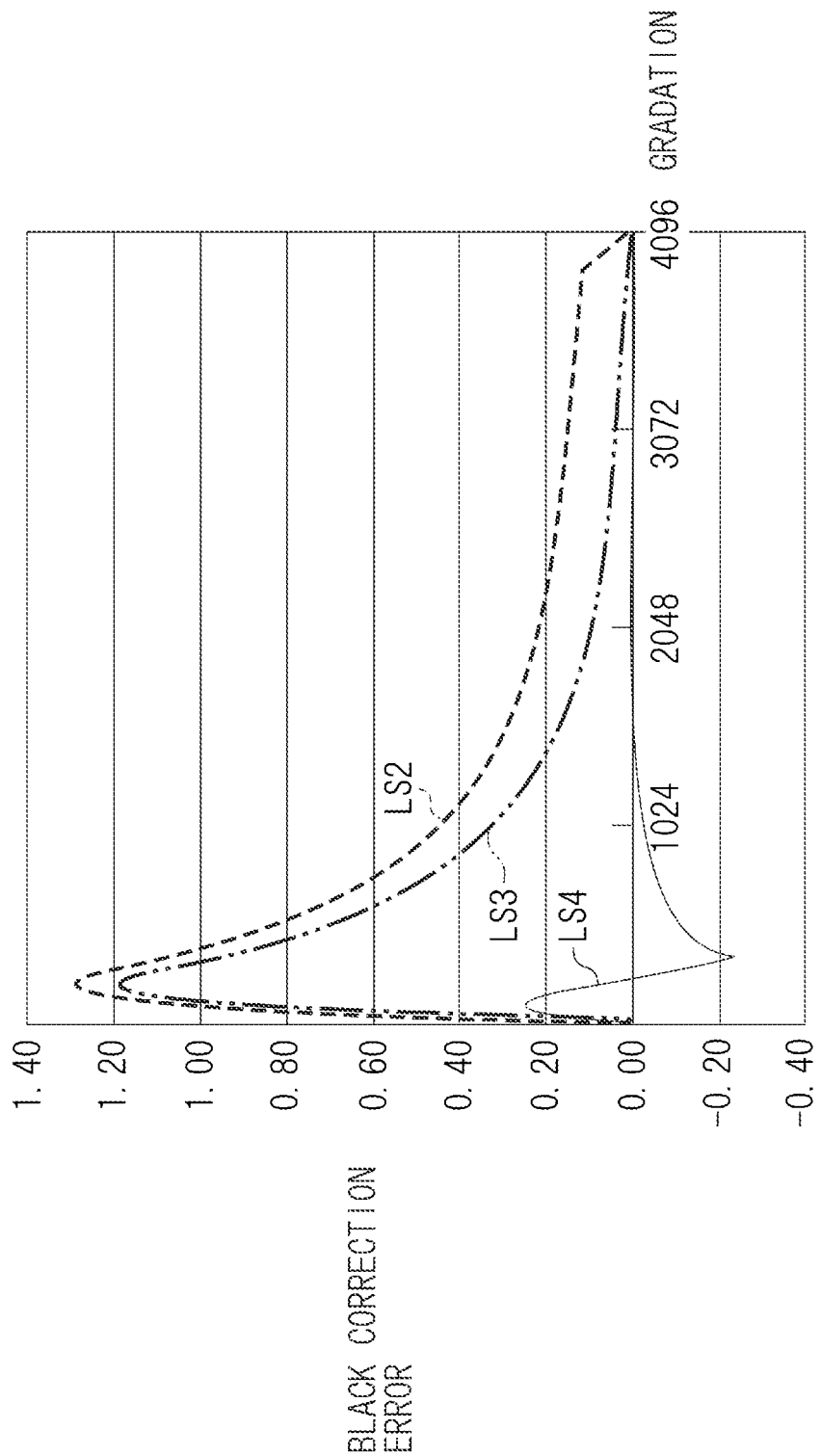
FIG. 6 illustrates a first example of relationships between black correction error and gradation of an input image signal.

FIG. 6 illustrates an example of a relationship between a black correction error with respect to the luminance of a projection image (difference between the luminance of the projection images 1000 and 2000 having undergone the black correction and the luminance of the image overlap area 3000) and the gradation of an input image signal.

In FIG. 6, a graph LS2 shows a case where the same offset correction value is added to all gradations of the input image signal. A graph LS3 shows a case where the offset correction value, which is linearly decreased at the lowest gradation, is added to the input image signal so that the offset correction value at the highest gradation becomes 0. A graph LS4 is a graph of a case where the offset correction value, which is decreased at the lowest gradation, is added to the input image signal so that the offset correction value at a predetermined gradation becomes 0 as in the present exemplary embodiment. As illustrated in FIG. 6, it can be understood that use of the offset control circuit 230 can decrease the luminance discontinuity in all gradation areas of the input image signal.

Desirably, the predetermined gradation at which the offset correction value becomes 0 is determined to balance the range in which the correction is excessive and the range in which the correction is insufficient. For example, the offset control circuit 230 uses an expression (2) to derive a predetermined gradation Lset at which the offset correction value becomes 0:

$$Lset = \alpha \times Dblk \quad (2)$$

where α denotes a coefficient that is equal to or greater than 1. According to the studies conducted by the present inventors, when the coefficient α is set to about 1.7 (α=1.7), the range in which the correction is excessive and the range in which the correction is insufficient can be balanced. In the present exemplary embodiment, however, the value of the predetermined gradation Lset can arbitrarily be set, for example, within a range according to the expression (2).

As described above, according to the present exemplary embodiment, the offset correction value Doffset that is linearly decreased at the lowest gradation of the input image signal so that the offset correction value becomes 0 at gradation levels that are higher than the predetermined gradation Lset is added to the input image signal. The predetermined gradation Lset is obtained by, for example, multiplying the offset correction value Dblk at the lowest gradation by the coefficient α of 1 or greater. Accordingly, a projection type image display apparatus capable of forming a multiscreen display in which changes in luminance between the image overlap area 3000 and the areas outside the image overlap area 3000 are decreased across a range of low to high gradations, can be provided. Thus, a projection type image display apparatus capable of forming a multiscreen display, in which the unity of the screen is not impaired across all gradation areas, can be provided.

Next, a second exemplary embodiment of the present invention will be described. The present exemplary embodiment is different from the first exemplary embodiment mainly in that a degamma circuit 250 is provided in front of the offset control circuit 230 and the adder 240 and a gamma circuit 260 is provided following the adder 240 in the black correction circuit 200. In the present exemplary embodiment, elements that are similar to those of the first exemplary embodiment are given the same reference numerals as those in FIGS. 1 to 6, and detailed description thereof is omitted.

FIG. 7 is a block diagram schematically illustrating an example of a configuration of a projection type image display apparatus 20 according to the present exemplary embodiment.

In view of general gamma characteristics (=2.2) of a display, the input image signal has been raised to the power of a gamma value of 1/2.2.

The degamma circuit 250 performs gradation conversion (degamma correction) on an input image signal so that a change in the gradation of the input signal becomes substantially linear to a change in the display luminance. Ideally, the input image signal is raised to the power of 2.2 to linearize a change in the gradation of the input image signal with respect to a change in the display luminance. The gamma circuit 260 performs the gradation conversion again on the input image signal to which the offset correction value has been added. Ideally, in view of gamma characteristics of the display, the gamma circuit 260 raises the input signal image to which the offset correction value has been added to the power of 1/2.2 (performs gamma correction).

In a case where the degamma circuit 250 and the gamma circuit 260 perform the gradation conversion (image signal is raised to the power of 1/2.2 and to the power of 2.2), it is ideal that the offset correction value is the same for all gradations. However, the operation of raising the input image signal to the power of 1/2.2 at the degamma circuit 250 impairs the gradation of the input image signal. Hence, if a processing bit number is insufficient, gradation collapse occurs. For example, if the processing bit number is set to 12 (processing bit number=12), about 30% of gradation becomes defective. Thus, the gamma value used in the degamma circuit 250 and the gamma circuit 260 is decreased to be smaller than 2.2 so that while the gradation is converted to change substantially linearly, the luminance discontinuity is decreased with decreased gradation collapse. For example, if the gamma value is set to 1.45 ($\gamma$=1.45), when the processing bit number is 12 (processing bit number=12), the gradation collapse can be decreased to about 15%.

In this case, it is still effective to perform control by use of the offset control circuit 230 so that the offset correction value becomes 0 at the predetermined gradation Lset, as described in the first exemplary embodiment.

FIG. 8 illustrates an example of a relationship between a black correction error (difference between the luminance in the projection images 1000 and 2000 and the luminance in the image overlap area 3000 having undergone the black correction) with respect to the luminance of a projection image and the gradation of an input image signal. FIG. 8 illustrates as an example a case where the gamma value is set to 1.45.

In FIG. 8, a graph LS2 shows a case where the same offset correction value is added to all gradations of the input image signal. A graph LS3 shows a case where the offset correction value, which is linearly decreased at the lowest gradation, is added to the input image signal, so that the offset correction value at the highest gradation becomes 0. A graph LS4 is a graph of a case where the offset correction value, which is decreased at the lowest gradation, is added to the input image signal so that the offset correction value at a predetermined gradation becomes 0 as in the present exemplary embodiment.

A comparison of FIG. 8 with FIG. 6, which illustrates the black correction error in the first exemplary embodiment, shows that the present exemplary embodiment can further decrease the luminance discontinuity.

In the present exemplary embodiment, the predetermined gradation Lset at which the offset correction value becomes 0 is also determined to balance the range in which the correction is excessive and the range in which the correction is insufficient with respect to the input image signal having undergone the gradation conversion at the degamma circuit 250, as in the first exemplary embodiment. If the predetermined gradation Lset is set to be $\alpha$ times the offset correction value Dblk at the lowest gradation, the range in which the correction is excessive and the range in which the correction is insufficient can be balanced. The value of the coefficient $\alpha$ is desirably increased for greater gamma values used in the degamma circuit 250 and the gamma circuit 260.

According to the studies conducted by the present inventors, when the gamma value is 1.45 ($\gamma$=1.45), the coefficient $\alpha$ can be set to about 3 ($\alpha$=3).

In the present exemplary embodiment, after the change in the gradation of the input image signal is adjusted to be substantially linear to the change in the luminance of the projection image to be displayed, the processing described in the first exemplary embodiment is performed, and then the input image signal to which the offset correction value is added by the processing is subjected to the gradation conversion again. Accordingly, a projection type image display apparatus capable of forming a multiscreen display in which changes in luminance between the image overlap area 3000 and the areas outside the image overlap area 3000 are decreased across a range of low to high gradations can be provided.

Next, a third exemplary embodiment of the present invention will be described. In the present exemplary embodiment, an offset correction value is calculated for each gradation (all gradations) of an input image signal. The present exemplary embodiment is different from the first and second exemplary embodiments mainly in a method of obtaining the offset correction value. Thus, in the present exemplary embodiment, elements that are similar to those of the first and second exemplary embodiments are given the same reference numerals as those in FIGS. 1 to 8, and detailed description thereof is omitted.

A block diagram schematically illustrating an example of a configuration of a projection type image display apparatus according to the present exemplary embodiment is the same as the block diagram (FIG. 1) illustrating the projection type image display apparatus 10 according to the first exemplary embodiment.

Figure 9A:
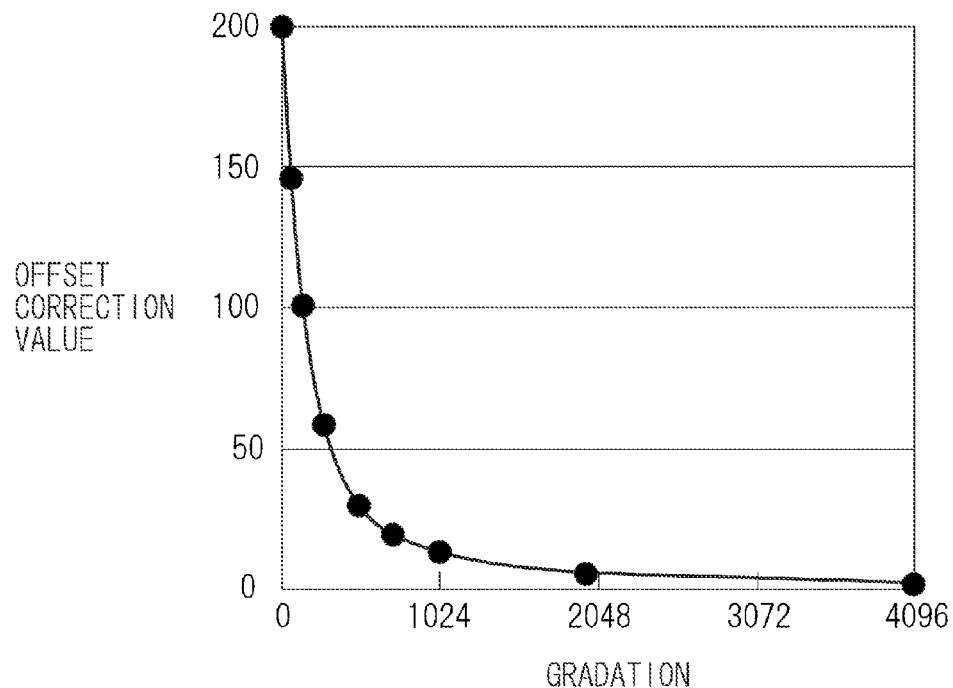
FIGS. 9A and 9B illustrate a relationship between an offset correction value and gradation of an input image signal, and a relationship between a black correction error and the gradation of the input image signal.
Figure 9B:
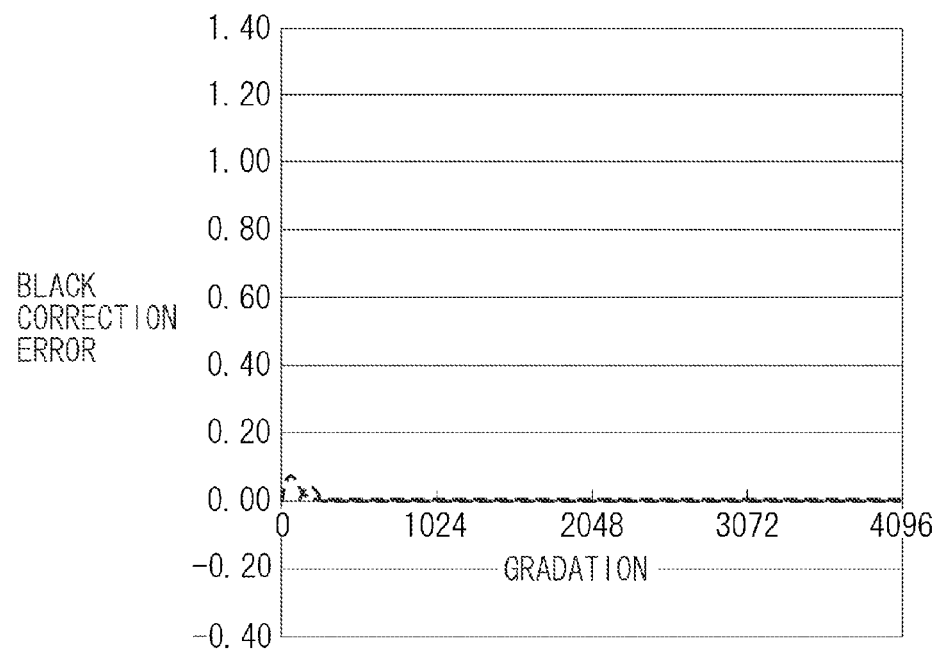

FIGS. 9A and 9B illustrate an example of a relationship between the offset correction value and the gradation of the input image signal (FIG. 9A) and an example of a relationship between the black correction error with respect to the luminance of the projection image and the gradation of the input image signal (FIG. 9B). For example, an offset correction value (offset addition characteristic) for the gradation of an input image signal that is required to realize the luminance characteristic of a projection image in the image overlap area 3000 illustrated in FIG. 2 can be estimated as shown in FIG. 9A. To realize the offset addition characteristic, the black correction circuit 200 is configured to hold at least offset correction values corresponding to a plurality of gradations.

In a case of setting an offset correction value that corresponds to an arbitrary gradation among the plurality of gradations, the offset correction value is calculated by using interpolation. As to a method for the interpolation of an offset correction value, for example, a linear interpolation method is simple. In the linear interpolation method, offset correction values for two gradations that are adjacent to each other and sandwich a gradation for which an offset correction value is to be calculated, are used. However, the method for the interpolation of an offset correction value is not limited to the linear interpolation method. In the example illustrated in FIG. 9A, offset correction values are set with respect to nine gradations of 0, 128, 256, 384, 512, 768, 1024, 2048, and 4096, and offset correction values with respect to gradations between the respective nine gradations are linearly interpolated to calculate the offset addition characteristic. As illustrated in FIG. 9A, the offset addition characteristic is substantially inversely proportional. Thus, offset correction values can be set for more gradations in the low-gradation range of the input image signal and for fewer gradations in the high-gradation range.

FIG. 9B illustrates a black correction error in the present exemplary embodiment. FIG. 9B indicates that the black correction error can further be reduced, compared to the first and second exemplary embodiments. In the second exemplary embodiment, the degamma circuit 250 and the gamma circuit 260 are generally realized by look-up tables (LUT), so that the sizes of the circuits increase. On the other hand, in the present exemplary embodiment, only the calculation of the offset addition characteristic by the black correction circuit 200 is needed, and no LUT for the gradation conversion is necessary. This prevents an increase in size of the circuits. However, the offset addition characteristic may be stored in advance.

As described above, in the present exemplary embodiment, an offset correction value is calculated for each gradation (all gradations) of an image signal. Accordingly, a projection type image display apparatus capable of forming a multiscreen display in which changes in luminance between the image overlap area 3000 and the areas outside the image overlap area 3000 are decreased across a range of low to high gradations can be provided without increasing the sizes of the circuits.

The exemplary embodiments described above are merely illustrative of examples of the principles and applications of the present invention, so that it is to be understood that the scope of the invention should not be limited to the exemplary embodiments. It is therefore to be understood that the present invention can be implemented in various forms without departing from the spirit or principles thereof.

According to the exemplary embodiments of the present invention, different offset correction values are respectively added to at least a part of image signals of the areas outside the image overlap area, depending on the gradation of the image signals of the areas outside the image overlap area. This can form a multiscreen in which changes in luminance between the image overlap area and the areas outside the image overlap area are less likely to be visibly recognized across a range of low to high gradations.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-098738 filed May 8, 2013, which is hereby incorporated by reference herein in its entirety.

What is claimed is:

1. A display control apparatus comprising:
a processor; and
a memory storing one or more programs configured to be executed by the processor, the one or more programs including instructions for:
projection controlling to cause a projector to project an image based on an input image signal;
receiving a designation of an offset correction value corresponding to a smallest gradation value;
determining a gradation threshold value based on the received offset correction value,
wherein the gradation threshold value is determined by multiplying the offset correction value with a predetermined coefficient value A (A≥1), and
wherein the predetermined coefficient value A is approximately 1.7; and
controlling to add, to a gradation value which is lower than the gradation threshold value, which is determined based on the offset correction value corresponding to the smallest gradation value, among an input image signal corresponding to a non-overlap area in which a first projection area displaying a first image projected from the projector does not overlap a second projection area displaying a second image projected from another projector, an offset correction value which is determined according to the gradation value, wherein the controlling does not add the offset correction value to a gradation value which is higher than the gradation threshold value.

2. The display control apparatus according to claim 1, wherein the one or more programs include instructions for:
performing degamma correction on the input image signal; and
performing gamma correction on the image signal having undergone the degamma correction,
wherein the controlling increases the gradation value on the image signal having undergone the degamma correction,
wherein the gamma correction is performed on the image signal having undergone the controlling to increase the gradation value, and
wherein the projector projects an image based on the image signal having undergone the gamma correction.

3. The display control apparatus according to claim 1, further comprising a memory for storing a gradation value of the input image signal and an amount of correction of the gradation value associated with each other,
wherein the controlling increases the gradation value of the input image signal based on the information stored in the memory.

4. The display control apparatus according to claim 3, wherein the memory stores a predetermined number of gradation values of the image signal and an amount of correction of the gradation value associated with each other, and
wherein the controlling determines the correction amount of the gradation value by performing interpolating processing on the correction amount stored in the memory based on the gradation value of the input image signal.

5. A display control method to be executed by a display control apparatus including a projector configured to project an image based on an input image signal, the display control method comprising:
receiving a designation of an offset correction value corresponding to a smallest gradation value;
determining a gradation threshold value based on the received offset correction value,
wherein the graduation threshold value is determined by multiplying the offset correction value with a predetermined coefficient value A (A≥1), and
wherein the predetermined coefficient value A is approximately 1.7; and
controlling to add, to a gradation value which is lower than the gradation threshold value, which is determined based on the offset correction value corresponding to the smallest gradation value, among an image signal corresponding to a non-overlap area in which a first projection area displaying a first image projected from the projector does not overlap a second projection area displaying a second image projected from another projector, an offset correction value which is determined according to the gradation value, such that an increased gradation value of a first pixel is higher than an increased gradation value of a second pixel, wherein the adding does not add the offset correction value to a gradation value which is higher than the gradation threshold value.

6. The display control method according to claim 5, further comprising:
performing degamma correction on the image signal; and
performing gamma correction on the image signal having undergone the degamma correction,
wherein the controlling increases the gradation value of the image signal having undergone the degamma correction,
wherein the gamma correction is performed on the image signal having undergone the controlling to increase the gradation value, and
wherein the projector projects an image based on the image signal having undergone the gamma correction.

7. The display control method according to claim 5, further comprising:
obtaining information from a storage unit configured to store a gradation value of the image signal and an amount of correction of the gradation value associated with each other,
wherein the controlling increases the gradation value of the input image signal based on information stored in the storage unit.

8. A non-transitory computer-readable storage medium storing a program executable by a computer including a projector configured to project an image based on the input image signal to perform a display control method, the display control method comprising:
receiving a designation of an offset correction value corresponding to a smallest gradation value;
determining a gradation threshold value based on the received offset correction value,
wherein the graduation threshold value is determined by multiplying the offset correction value with a predetermined coefficient value A (A≥1), and
wherein the predetermined coefficient value A is approximately 1.7; and
controlling to add, to a gradation value which is lower than the gradation threshold value, which is determined based on the offset correction value corresponding to the smallest gradation value, among an image signal corresponding to a non-overlap area in which a first projection area displaying a first image projected from the projector does not overlap a second projection area displaying a second image projected from another projector, an offset correction value which is determined according to the gradation value, such that an increased gradation value of a first pixel is higher than an increased gradation value of a second pixel, wherein the adding does not add the offset correction value to a gradation value which is higher than the gradation threshold value.

9. The computer-readable storage medium according to claim 8, further comprising:
performing degamma correction on the input image signal; and
performing gamma correction on the image signal having undergone the degamma correction,
wherein the controlling increases the gradation value on the image signal having undergone the degamma correction,
wherein the gamma correction is performed on the image signal having undergone the controlling to increase the gradation value, and
wherein the projector projects an image based on the image signal having undergone the gamma correction.

10. The computer-readable storage medium according to claim 8, further comprising:
obtaining information from a storage unit configured to store a gradation value of the image signal and an amount of correction of the gradation value associated with each other,
wherein the controlling increases the gradation value of the input image signal based on information stored in the storage unit.

* * * * *